United States Patent
Yang

(10) Patent No.: US 10,532,306 B2
(45) Date of Patent: Jan. 14, 2020

(54) FRAME-TYPE AIR PURIFIER WITH CHANGEABLE IMAGING SHEET

(71) Applicant: SAUBER TECHNOLOGY LIMITED, Taipei (TW)

(72) Inventor: Kuan-Li Yang, Taipei (TW)

(73) Assignee: SAUBER TECHNOLOGY LIMITED, Taipei (TW)

( * ) Notice: Subject to any disclaimer, the term of this patent is extended or adjusted under 35 U.S.C. 154(b) by 61 days.

(21) Appl. No.: 15/946,188

(22) Filed: Apr. 5, 2018

(65) Prior Publication Data

US 2018/0296958 A1 Oct. 18, 2018

Related U.S. Application Data

(63) Continuation-in-part of application No. 15/596,401, filed on May 16, 2017, now abandoned.

(30) Foreign Application Priority Data

Apr. 14, 2017 (TW) .............................. 106112686 A
Feb. 26, 2018 (TW) .............................. 107106447 A

(51) Int. Cl.
*B01D 46/10* (2006.01)
*A47G 1/06* (2006.01)
(Continued)

(52) U.S. Cl.
CPC ........... *B01D 46/0005* (2013.01); *A47G 1/06* (2013.01); *A47G 1/0616* (2013.01); *B01D 46/10* (2013.01); *A47G 2001/0666* (2013.01); *A47G 2001/0672* (2013.01); *A47G 2001/0677* (2013.01); *A47G 2001/0694* (2013.01); *B01D 2279/40* (2013.01)

(58) Field of Classification Search
CPC ................ B01D 46/0005; B01D 46/10; B01D 2279/40; A47G 1/0616; A47G 1/06; A47G 2001/0677; A47G 2001/0666; A47G 2001/0672; A47G 2001/0694; F16B 1/00;
(Continued)

(56) References Cited

U.S. PATENT DOCUMENTS 5,533,288 A * 7/1996 Lambert .................. A47G 1/06
  40/754
6,328,775 B1 * 12/2001 Fuchs .................... A62B 23/04
  109/1 S
(Continued)

*Primary Examiner* — Minh Chau T Pham
(74) *Attorney, Agent, or Firm* — Rabin & Berdo, P.C.

(57) ABSTRACT

A frame-type air purifier includes a purifier housing, a main frame and an image board. The purifier housing has a back plate and a front plate configured opposite to each other. The back plate has a wall positioner configured thereon. The front plate includes a first quick-demounting member configured thereon. The main frame has a central hollow and a second quick-demounting member configured thereon. The image board includes a baseboard and an imaging sheet configured on the baseboard, wherein the baseboard has a third quick-demounting member configured thereon. The first quick-demounting member of the purifier housing selectively assembles with the second quick-demounting member of the main frame correspondingly, or selectively assembles with the third quick-demounting member of the image board correspondingly.

7 Claims, 13 Drawing Sheets

(51) Int. Cl.
*F16B 1/00* (2006.01)
*F16M 13/02* (2006.01)
*B01D 46/00* (2006.01)

(58) Field of Classification Search
CPC ..... F16B 11/006; F16M 13/02; F16M 13/022; F16M 2001/0035
USPC ......... 55/490, 491, 493, 497, 501, 506, 511, 55/521, DIG. 31; 248/201, 467; 454/184
See application file for complete search history.

(56) References Cited

U.S. PATENT DOCUMENTS

| | | | |
|---|---|---|---|
| 10,255,831 B1* | 4/2019 | Buck | G09F 13/0413 |
| 2006/0143964 A1* | 7/2006 | Chatellier | A47G 1/065 |
| | | | 40/711 |
| 2007/0204575 A1* | 9/2007 | Lisbona | B01D 46/0004 |
| | | | 55/495 |
| 2008/0045133 A1* | 2/2008 | Pfannenberg | B01D 46/10 |
| | | | 454/184 |
| 2014/0353455 A1* | 12/2014 | Floyd | A47G 1/0616 |
| | | | 248/467 |
| 2015/0375152 A1* | 12/2015 | Simmons | E06B 9/01 |
| | | | 55/491 |
| 2018/0111408 A1* | 4/2018 | Rochman | B43L 1/00 |

\* cited by examiner

FRAME-TYPE AIR PURIFIER WITH CHANGEABLE IMAGING SHEET

CROSS-REFERENCE TO RELATED APPLICATION

This application is a continuation-in-part (CIP) of application Ser. No. 15/596,401, filed on May 6, 2017 with claiming foreign priority of TW106112686.

This application claims additional priority under 35 U.S.C. § 119(a) on Patent Application No. 107106447 filed in Taiwan, R.O.C. on Feb. 26, 2018. The prior applications are herewith incorporated by reference in its entirety.

BACKGROUND

Related Field

The instant disclosure relates to an air purifier, in particular, to a frame-type air purifier with a changeable imaging sheet.

Related Art

As the developing of industries and the increasing of vehicles, the air quality of our living environment has been dramatically deteriorating with particulate matters massively increased in the air. The particulate matters suspend in the atmosphere for a very long duration, which may enter into the human body while breathing, then accumulate in the tracheas or the lungs. Eventually, the particulate matters seriously affect human health, such as damaging our respiratory system and cardiovascular system, and causing allergies, asthmas, lung cancers, cardiovascular diseases, birth defects and early infant death.

Thus, people use air purifiers in home or office environment to purify the air and reduce the damages from the air contaminants. However, generally the available air purifiers are floor-type and disposed on the ground, which occupies an interior space and affects the interior traffic flows.

Accordingly, there are air purifiers configured for hanging on a wall. Nevertheless, simply hanging an air purifier on a wall results in oddness and affects the overall elegance of the interior environment.

SUMMARY

In an embodiment, a frame-type air purifier includes a purifier housing, a main frame and an image board. The purifier housing includes a back plate and a front plate configured opposite to each other, wherein the back plate has a wall positioner configured thereon, and the front plate has a first quick-demounting member configured thereon. The main frame includes a central hollow and a second quick-demounting member. The image board includes a baseboard and an imaging sheet configured on the baseboard, and the baseboard has a third quick-demounting member configured thereon. The first quick-demounting member of the purifier housing selectively assembles with the second quick-demounting member of the main frame correspondingly, or selectively assembles with the third quick-demounting member of the image board correspondingly.

In another embodiment, a frame-type air purifier includes a purifier housing and a main frame. The purifier housing includes a back plate and a front plate configured opposite to each other, wherein the back plate has a wall positioner configured thereon, and the front plate includes a first quick-demounting member configured thereon. The main frame includes a central hollow and a second quick-demounting member configured thereon. The first quick-demounting member of the purifier housing correspondingly assembles with the second quick-demounting member of the main frame.

In another embodiment, a frame-type air purifier includes a purifier housing and an image board. The purifier housing includes a back plate and a front plate configured opposite to each other, wherein the back plate has a wall positioner configured thereon, and the front plate includes a first quick-demounting member configured thereon. The image board includes a baseboard and an imaging sheet configured on the baseboard, wherein the baseboard has a second quick-demounting member configured thereon. The first quick-demounting member of the purifier housing correspondingly assembles with the second quick-demounting member of the image board.

In brief, according to the embodiments of the instant disclosure, upon operation, the frame-type air purifier has its purifier housing hanging on a wall by the wall positioners to avoid occupying an interior space or any traffic flows. The frame-type air purifier can also selectively assemble the purifier housing with the main frame or with the image board through quick-demounting members for changing imaging sheets (such as paintings, images, photographs, mirrors or hand writing boards). Therefore, the frame-type air purifier is able to achieve the advantages of freely changing different functions according to user needs without affecting the elegance of the interior environment. Furthermore, as the frame-type air purifier has corresponding quick-demounting members configured between the purifier housing and the main frame, as well as between the purifier housing and the image board, the frame-type air purifier is capable of easily changing between different main frames or image boards, thereby changing different imaging sheets thereof or its appearance styles.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
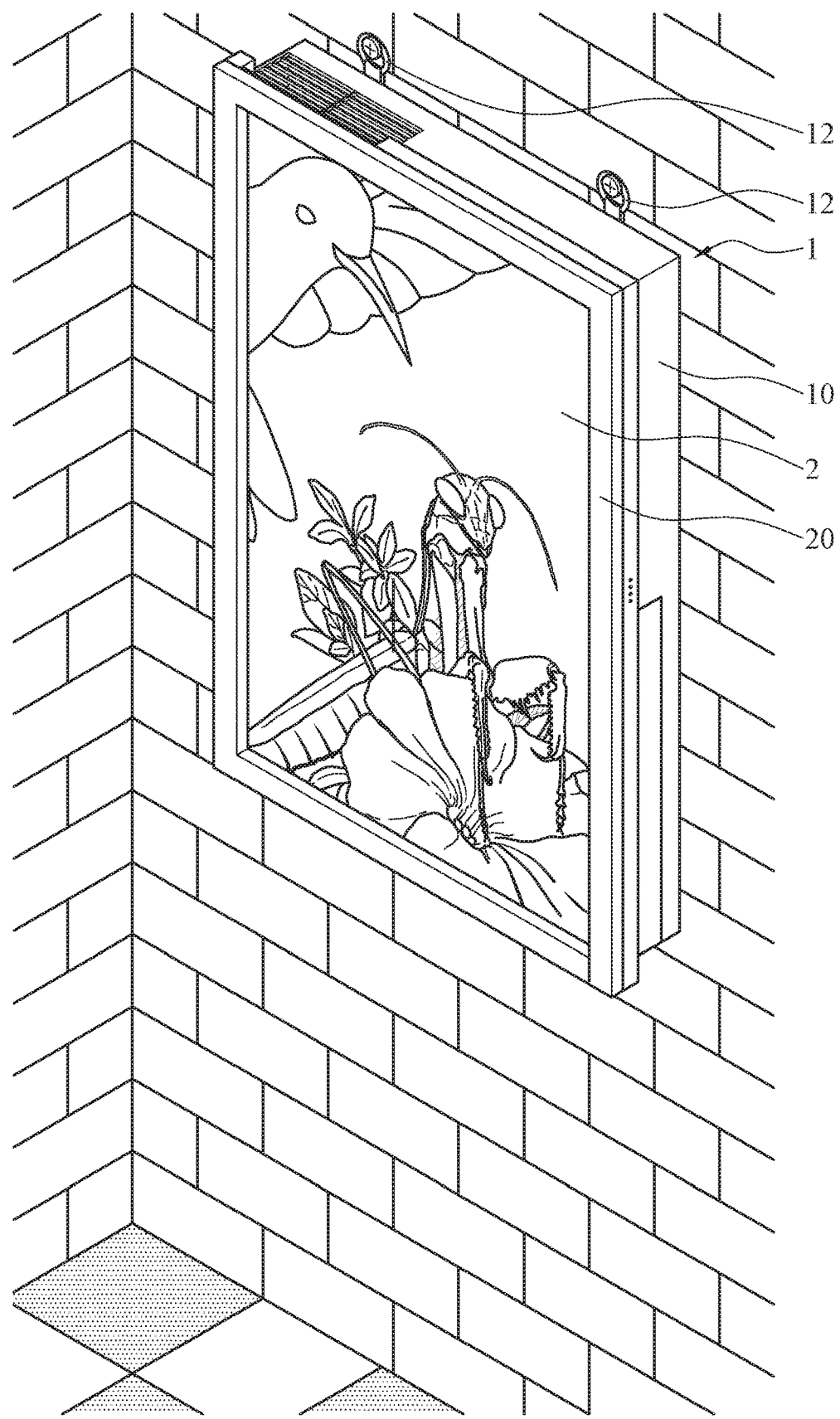
FIG. 1 illustrates an explanatory perspective view of a frame-type air purifier hanging on a wall according to an embodiment of the instant disclosure.

Please refer to FIG. 1, which illustrates an explanatory perspective view of a frame-type air purifier hanging on a wall according to an embodiment of the instant disclosure. A frame-type air purifier 1 may be hung on a wall to purify the air within the interior environment and to hang an imaging sheet 2 (such as paintings, images, photographs, mirrors or hand writing boards) thereon.

Figure 2:
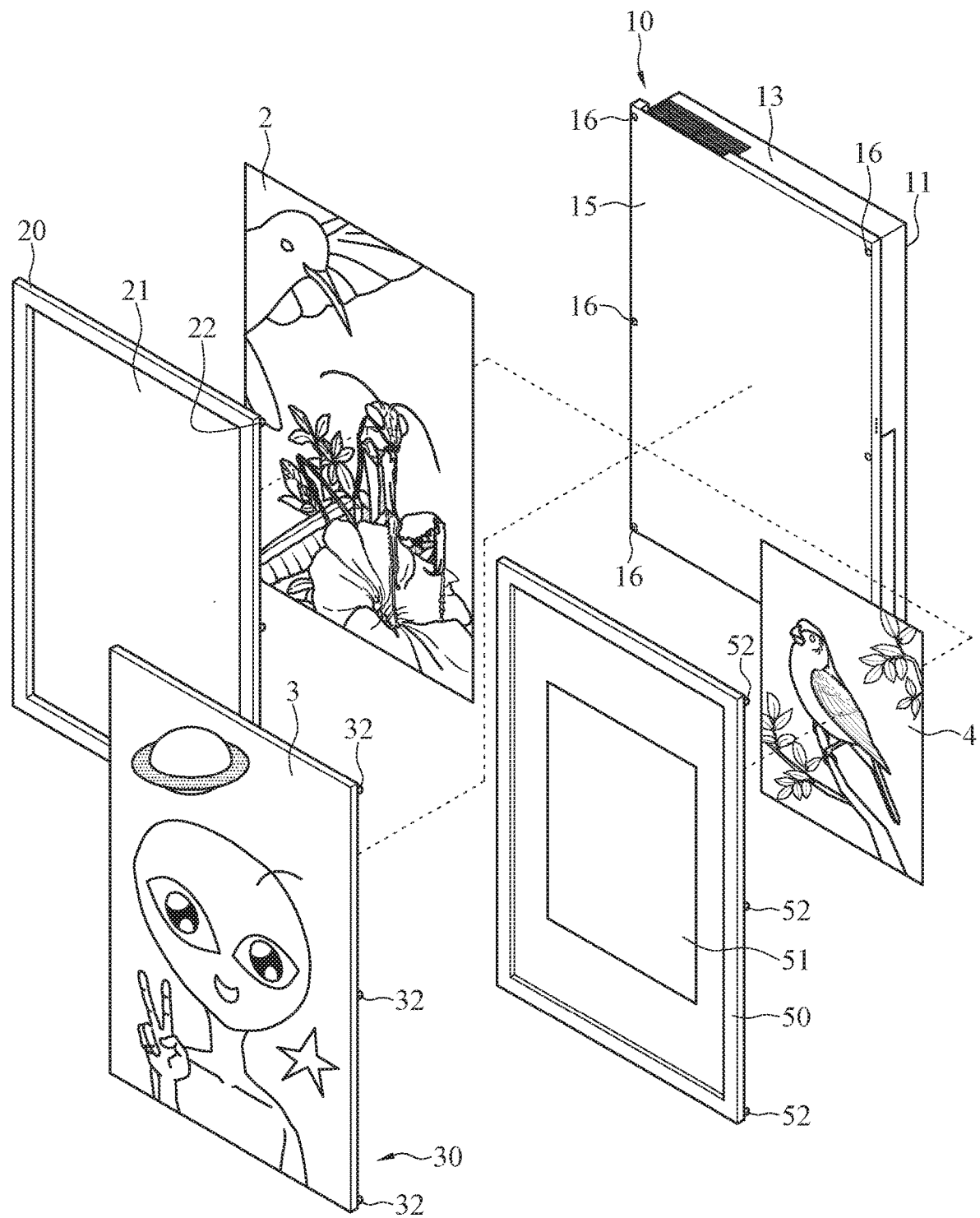
FIG. 2 illustrates an exploded perspective view of a frame-type air purifier according to a first embodiment of the instant disclosure.

Please refer to FIG. 2, which illustrates an exploded perspective view of a frame-type air purifier according to a first embodiment of the instant disclosure. In this embodiment, the frame-type air purifier 1 includes a purifier housing 10, a main frame 20, an image board 30 and an outer frame 50.

In an embodiment, the purifier housing 10 may be a hollow shell with rectangular, square, circular, ellipse or other shape. As shown in FIG. 2, in this embodiment, the purifier housing 10 is a rectangular hollow shell, and includes a back plate 11, a peripheral board 13 and a front plate 15. The peripheral board 13 is assembled between the peripheries of the front plate 15 and the back plate 11. The back plate 11 has a wall positioner 12 (as shown in FIG. 1) configured thereon. The wall positioner 12 may be, for example a hanging member, a hanging hole or a lock hole, so that the purifier housing 10 can be fastened and hanging on a wall via the wall positioner 12. The front plate 15 is a board opposite to the back plate 11, and on the surface of the front plate 15, at least a quick-demounting member 16 is configured thereon (multiple quick-demounting members 16 are shown herein). In some embodiments, the quick-demounting member 16 may be a fastening slot, a magnetic member or a hanging hole.

Figure 3:
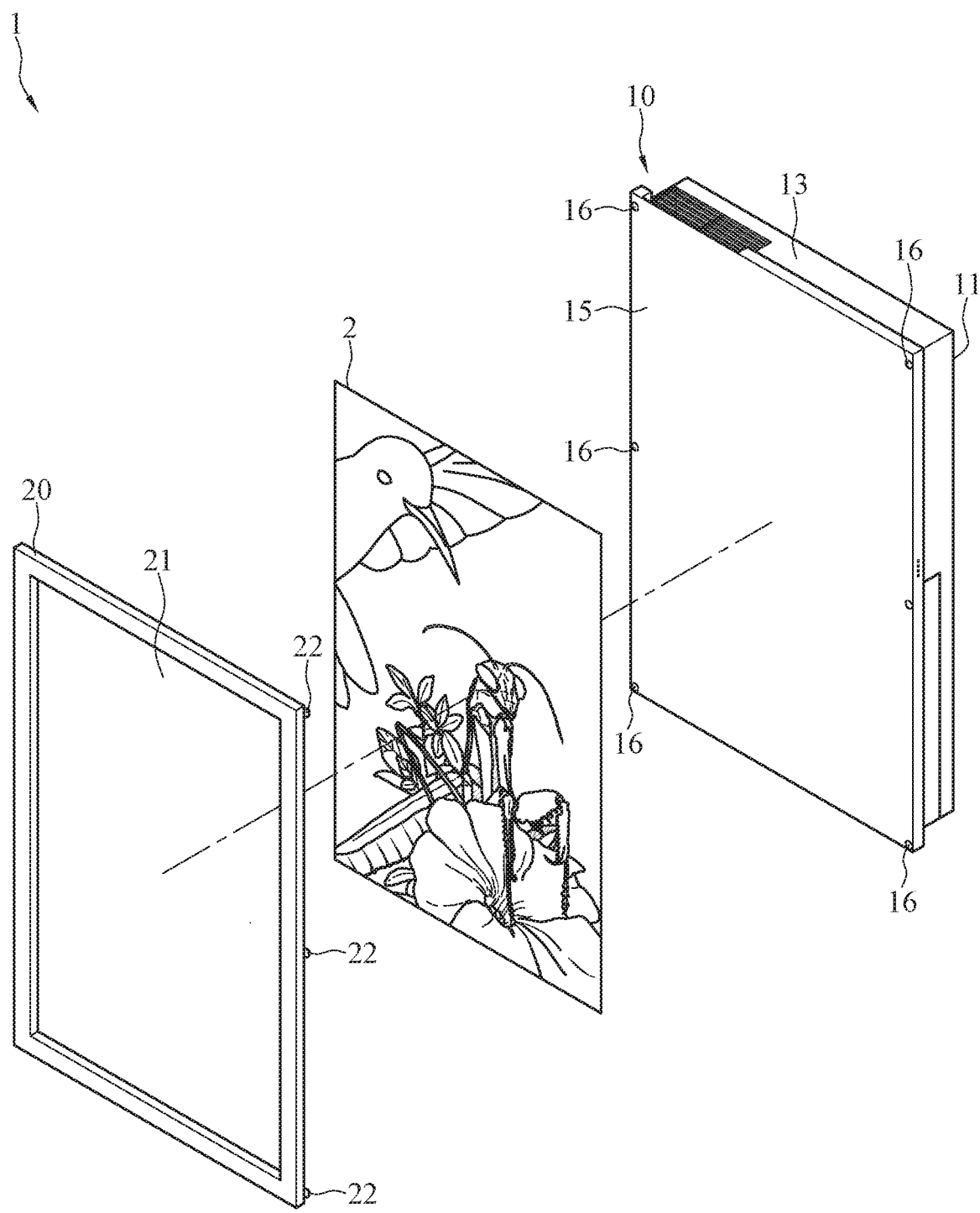
FIG. 3 illustrates an exploded perspective view of a purifier housing assembling with a main frame according to an embodiment of the instant disclosure.

In addition, as shown in FIG. 2, the purifier housing 10 may selectively assembles with one of the main frame 20, the image board 30 and the outer frame 50 by applying corresponding quick-demounting member(s) 16. For instance, each of the main frame 20, the image board 30 and the outer frame 50 may include a corresponding quick-demounting member respectively matching the quick-demounting member 16 of the purifier housing 10. For example, when the quick-demounting member 16 of the purifier housing 10 is a fastening slot, the quick-demounting member of each of the main frame 20, the image board 30 and the outer frame 50 may be a corresponding clasp member. When the purifier housing 10 quick-demounting member 16 of the purifier housing 10 is a hanging hole, the quick-demounting member of each of the main frame 20, the image board 30 and the outer frame 50 may be a corresponding hanging member. Detailed descriptions are provided with drawings in the following:

Please refer to FIG. 2 and FIG. 3, wherein FIG. 3 illustrates an exploded perspective view of a purifier housing assembling with a main frame according to an embodiment of the instant disclosure. The main frame 20 is a frame corresponding to the shape of the purifier housing 10. As shown in FIG. 3, the main frame 20 is a rectangular frame with a central hollow 21, and the main frame 20 includes at least a quick-demounting member 22 configured thereon to correspondingly assemble with the quick-demounting member 16 of the purifier housing 10. For instance, when the quick-demounting member 16 of the purifier housing 10 is a fastening slot, the quick-demounting member 22 of the main frame 20 may be realized by a corresponding clasp member. Thus, the purifier housing 10, by using its quick-demounting member 16, is able to correspondingly assemble with the quick-demounting member 22 of the main frame 20, thereby fastening the main frame 20 onto the front plate 15 and demounting from the purifier housing 10 easily.

Furthermore, as shown in FIG. 3, in this embodiment, a user may fasten (adhere, attach or insert) the imaging sheet 2 onto the front plate 15 of the purifier housing 10, and then fasten the main frame 20 onto the front plate 15 with its quick-demounting member 22. Accordingly, the main frame 20 is configured as the peripheral frame of the imaging sheet 2, and the imaging sheet 2 is viewable through the central hollow 21 (as shown in FIG. 1). Alternatively, after the main frame 20 is fastened on the front plate 15, the peripheries of the imaging sheet 2 are pressed tightly by the main frame 20 to fasten the imaging sheet 2 on the front plate 15. Therefore, the user may easily demount the main frame 20 from the front plate 15 one day, to replace with different imaging sheet 2 or other main frame 20 with different shape or style. In addition, the imaging sheet 2 in the embodiment utilizes a painting as an example, such that the user can appreciate the imaging sheet 2 or decorate the interior space. However, such example should not be considered as a limitation to the instant disclosure. The imaging sheet 2 may also be realized by: a mirror for the user to check his/her appearance, or a hand writing board (such as a write board, black board or an electronic handwriting board, etc.) for the user to take notes.

Figure 4:
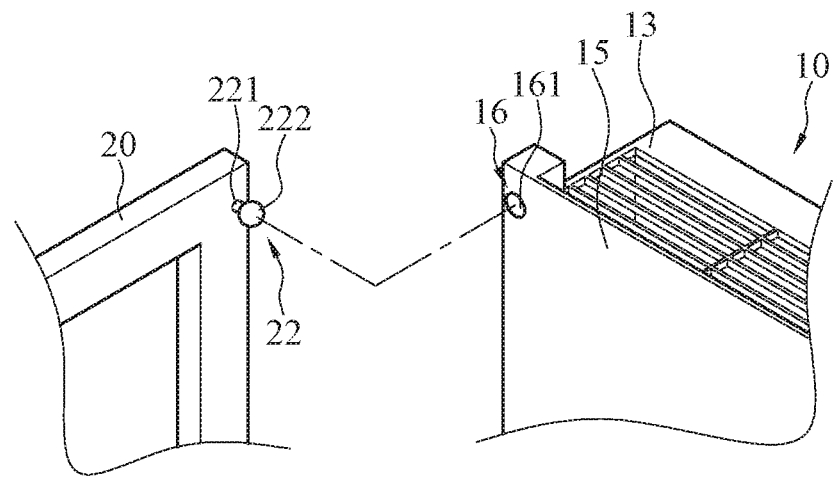
FIG. 4 illustrates an exploded perspective view of a quick-demounting member according to an embodiment of the instant disclosure.

Taking the main frame 20 as an example, its quick-demounting member 22 is able to assemble with the quick-demounting member 16 of the purifier housing 10 via different assembling methods as follows. Please refer to FIG. 3 and FIG. 4, wherein FIG. 4 illustrates an exploded perspective view of a quick-demounting member according to an embodiment of the instant disclosure. In this embodiment, the front plate 15 of the purifier housing 10 includes multiple quick-demounting members 16 configured thereon, wherein each of the quick-demounting members 16 is a fastening slot 161 and disposed surrounding the front plate 15. The main frame 20 also includes multiple quick-demounting members 22 to correspond to each of the quick-demounting members 16 on the front plate 15. As shown in FIG. 4, each of the quick-demounting members 22 may be a clasp member. Herein the quick-demounting member 22 includes a pillar 221 and a ball head 222 at an end of the pillar 221. The ball head 222 may be slightly larger than the fastening slot 161, so that the main frame 20 can have the ball head 222 correspondingly plugged into the fastening slot 161 to fasten itself onto the front plate 15. In an embodiment, these quick-demounting members 16 on the front plate 15 of the purifier housing 10 are preferably configured with symmetry according to the central point of the front plate 15 so that the main frame 20 can be fastened on the front plate 15 securely.

Figure 5:
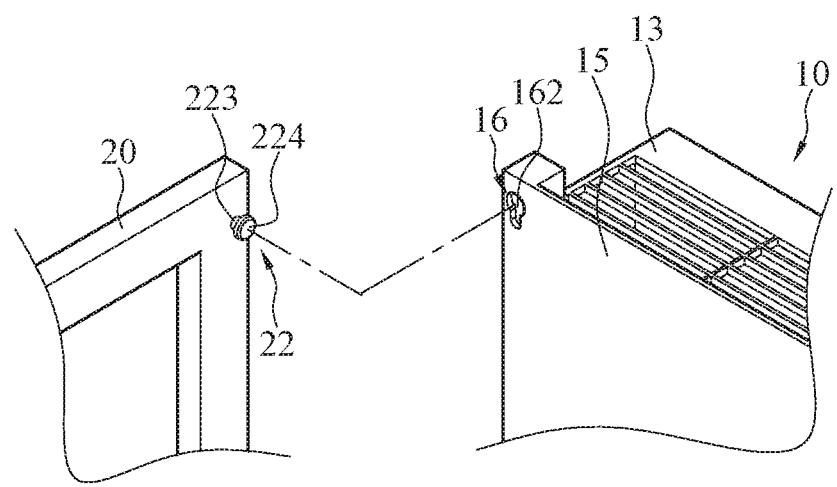
FIG. 5 illustrates an exploded perspective view of a quick-demounting member according to another embodiment of the instant disclosure.

FIG. 5 illustrates an exploded perspective view of a quick-demounting member according to another embodiment of the instant disclosure. As shown in FIG. 5, in this embodiment, each of the quick-demounting members 16 configured on the front plate 15 of the purifier housing 10 is realized by a hanging hole 162, namely the long hole with a bigger top portion and a smaller bottom portion. Meanwhile each of the quick-demounting members 22 of the main frame 20 is correspondingly a hanging member, as shown in FIG. 5. The hanging member of the quick-demounting member 22 includes a pillar 223 and a hanging head 224 at an end of the pillar 223, wherein the hanging head 224 is able to insert into the hanging hole 162 correspondingly, and the width of the hanging head 224 is greater than the width of the pillar 223. Therefore, the main frame 20 is able to utilize its hanging head 224 to insert into the bigger top portion of the hanging hole 162, and then by the gravity the pillar 223 is forced downwards to the smaller bottom portion of the hanging hole 162, thereby hooking and positioning onto the front plate 15. When the user has the need of demounting, simply lift the main frame 20 upwards and move outwards to allow the handing head 224 to pass through the hanging hole 162 and demount from the purifier housing 10.

Figure 6:
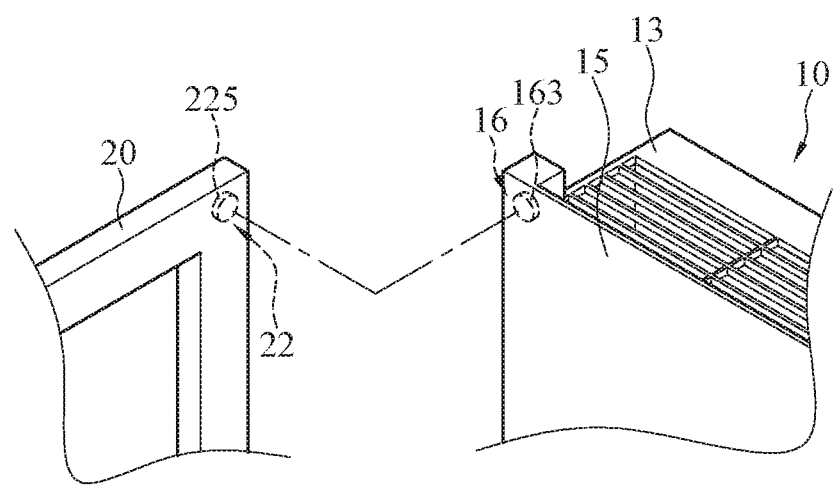
FIG. 6 illustrates an exploded perspective view of a quick-demounting member according to another embodiment of the instant disclosure.

FIG. 6 illustrates an exploded perspective view of a quick-demounting member according to another embodiment of the instant disclosure. As shown in FIG. 6, In this embodiment, each of the quick-demounting members 16 configured on the front plate 15 of the purifier housing 10 is realized by a magnetic member 163, while each of the quick-demounting members 22 on the main frame 20 is correspondingly a magnetic body 225. For instance, the magnetic member 163 and the magnetic body 225 may be respectively realized by magnets with different magnetic poles (such as ferrite, alnico or rear-earth magnet). Alternatively, one of the magnetic member 163 and the magnetic body 225 is realized by a magnet, while the other is realized by a ferromagnetic member (such as iron, nickel, cobalt or other metal members), so that the magnetic member 163 and the magnetic body 225 are able to attract each other. Therefore, the main frame 20 utilizes the magnetic member 163 to correspondingly attach to the magnetic body 225 and fasten on the front plate 15 securely. When the user has the need of demounting, simply apply some force to pull the magnetic member 163 away from the magnetic body 225 of the purifier housing 10 for removal, thereby achieving the advantages of easy and quick mounting/demounting.

Figure 7:
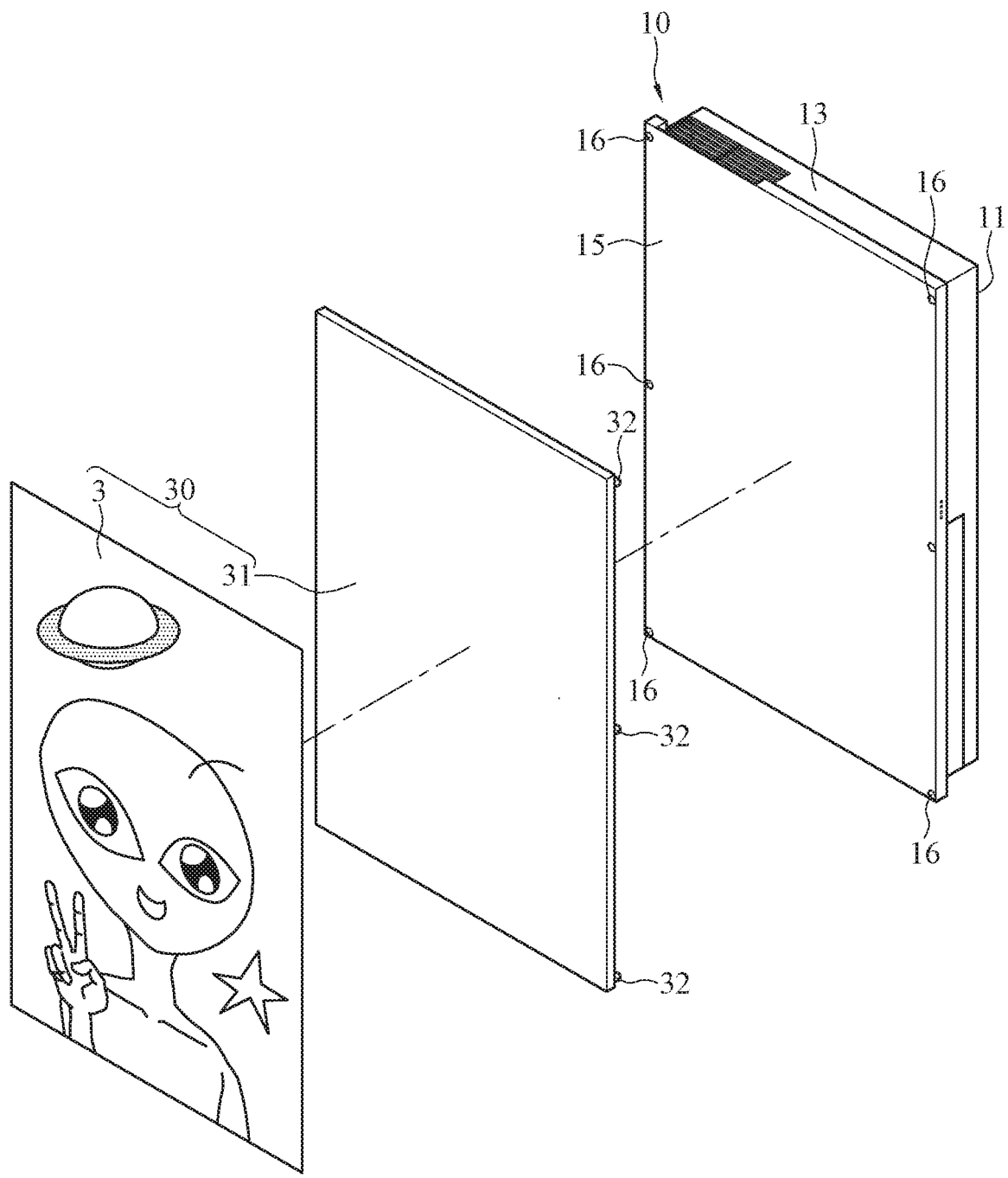
FIG. 7 illustrates an exploded perspective view of a purifier housing assembling with an image board according to an embodiment of the instant disclosure.

Please refer to FIG. 7, which illustrates an exploded perspective view of the purifier housing 10 assembling with the image board 30 according to the embodiment of FIG. 2. In this embodiment, the image board 30 includes a baseboard 31 and an imaging sheet 3 configured on the baseboard 31. The imaging sheet 3 may, for example, fastens (adhere, attach or insert) itself onto the surface of the baseboard 31. The baseboard 31 has multiple quick-demounting member 32 configured thereon, corresponding to each of the quick-demounting members 16 on the front plate 15. In addition, these quick-demounting members 32 are located on the rear surface of the baseboard 31 opposite to the side facing the imaging sheet 2. Therefore, the image board 30 is able to utilize its quick-demounting members 32 for correspondingly assembling with the quick-demounting members 16 of the front plate 15, thereby fastening on the purifier housing 10 securely.

Figure 8:
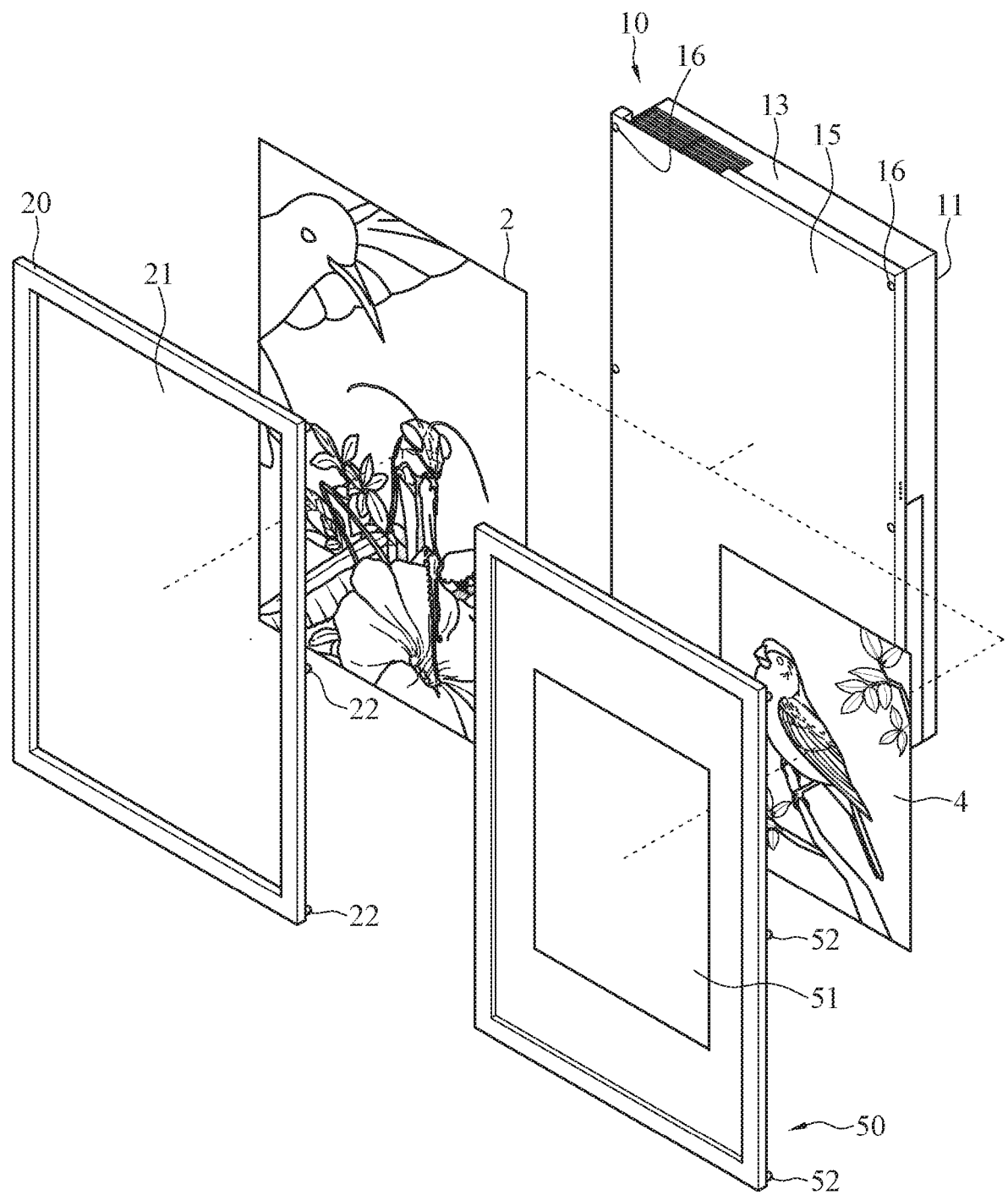
FIG. 8 illustrates an exploded perspective view of a purifier housing assembling with an outer frame according to an embodiment of the instant disclosure.

Please refer to FIG. 8, which illustrates an exploded perspective view of the purifier housing assembling with the outer frame according to the embodiment of FIG. 2. In this embodiment, the outer frame 50 includes an opening 51 smaller than the central hollow 21 of the main frame 20. In addition, the outer frame 50 includes multiple quick-demounting members 52 configured corresponding to each of the quick-demounting members 16 on the front plate 15. Accordingly, the purifier housing 10 is able to utilized its quick-demounting members 16 to selectively assemble with the quick-demounting members 22 of the main frame 20, or with the quick-demounting members 52 of the outer frame 50. Furthermore, for instance, since the opening 51 of the outer frame 50 is smaller than the central hollow 21 of the main frame 20, the outer frame 50 is able to accommodate a smaller imaging sheet 4. Namely, the user may select the main frame 20 or the outer frame 50 according to the different sizes of the imaging sheets 2, 4.

Accordingly, as shown in FIG. 2, the frame-type air purifier 1 has the quick-demounting member(s) 16 on the purifier housing 10 that selectively corresponds to the quick-demounting member(s) 22 of the main frame 20, to the quick-demounting members 32 of the image board 30, and to the quick-demounting member(s) 52 of the outer frame 50. Therefore, based on different needs, the user may selectively assemble the main frame 20, the image board 30 or the outer frame 50 onto the purifier housing 10.

In an embodiment, the main frame 20 includes two side frames 23 configured opposite to each other. At the inner sides of the side frame 23, a trough slot 24 is configured thereon respectively. In addition, the frame-type air purifier 1 includes a partition board 40, and the edges of the partition board 40 are able to engage into the trough slots 24 of the main frame 20. Please refer to FIG. 9, which illustrates an exploded perspective view of a frame-type air purifier according to a second embodiment of the instant disclosure. Herein, the partition board 40 is realized by a transparent board. Therefore, after the main frame 20 is fastened on the front plate 15 securely, the partition board 40 covers on the imaging sheet 2 to prevent from dusts in the air, with the imaging sheet 2 still being viewable externally by the user. In some embodiments, the main frame 20 includes two opposite vertical side frames and two opposite horizontal side frames. For example, both the two opposite side frame 23 may be vertical or horizontal, so that the partition board 40 may engage into the trough slots 24 vertically or horizontally. Alternatively, in an embodiment, the trough slots 24 are configured surrounding the inner sides of the main frame 20.

Figure 10:
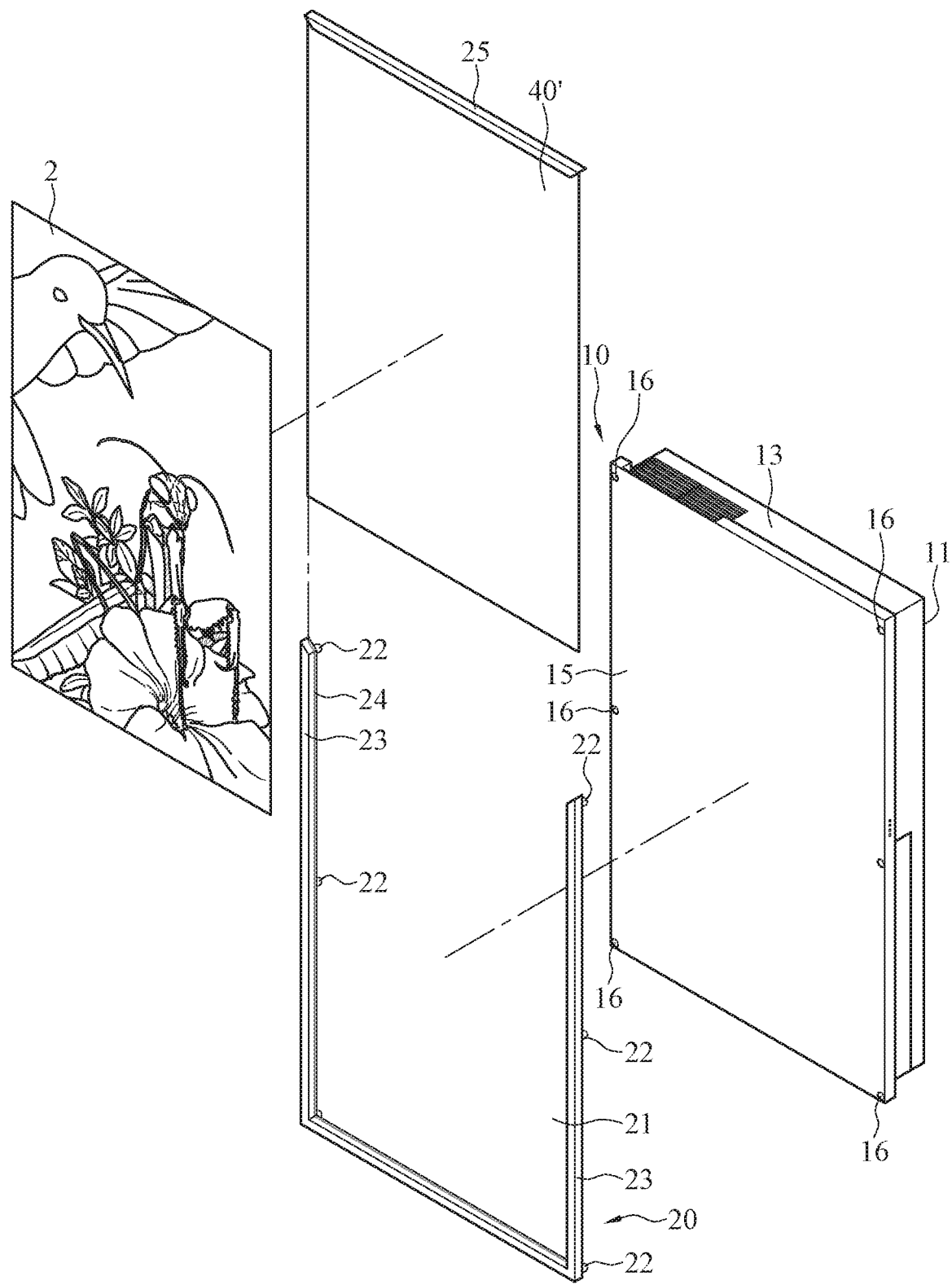
FIG. 10 illustrates an exploded perspective view of a frame-type air purifier according to a third embodiment of the instant disclosure.

Please refer to FIG. 10, which illustrates an exploded perspective view of a frame-type air purifier according to a third embodiment of the instant disclosure. In this embodiment, the partition board 40' is realized by an opaque board. The user may attach the imaging sheet 2 onto the surface of the partition board 40', and jointly engage into the trough slots 24 of the main frame 20, so that the imaging sheet 2 is directly fastened on the main frame 20.

Figure 9:
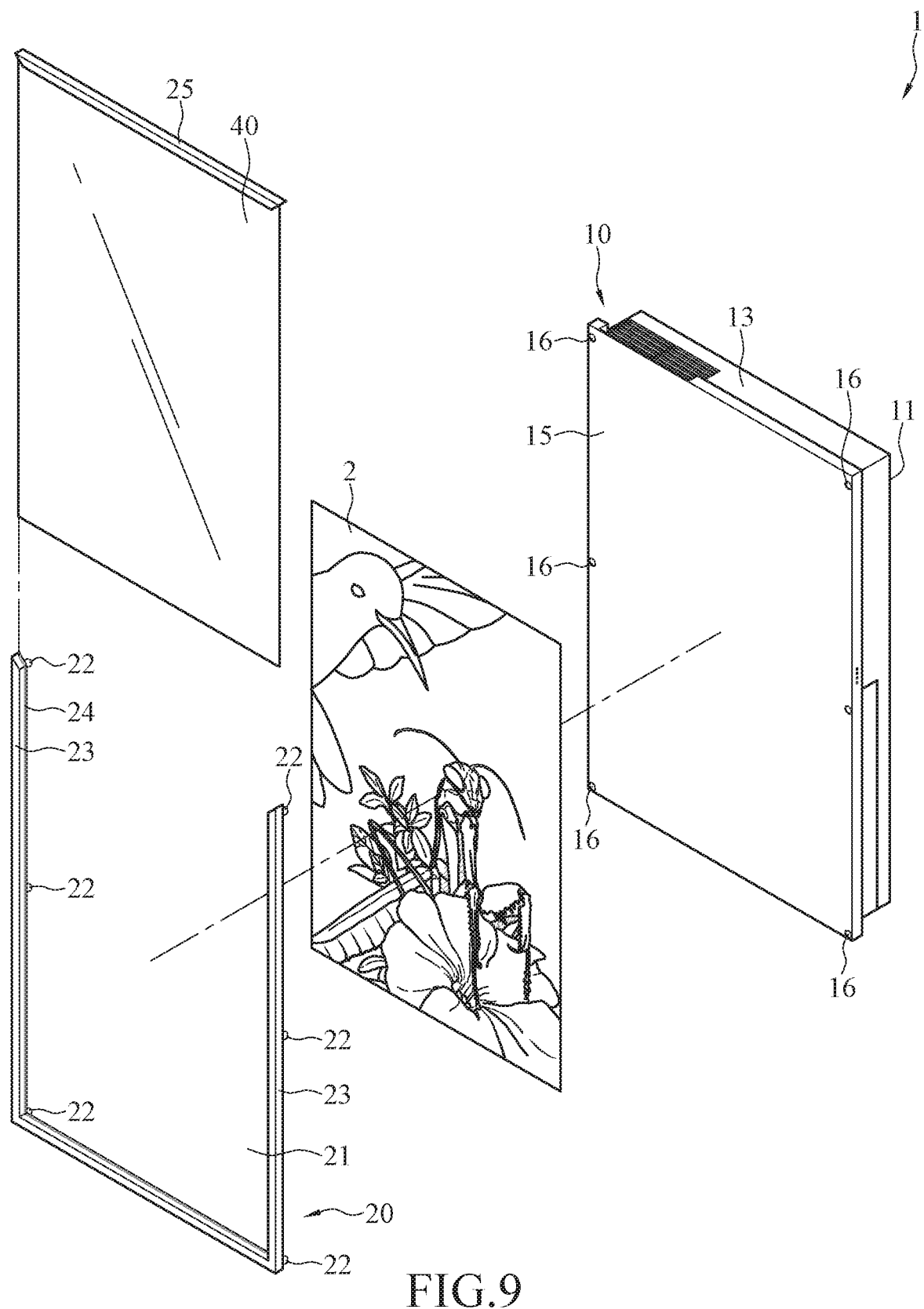
FIG. 9 illustrates an exploded perspective view of a frame-type air purifier according to a second embodiment of the instant disclosure.

In an embodiment, the main frame 20 includes a detachable side frame 25. The detachable side frame 25 is connectable between the ends of the two side frames 23. As shown in FIG. 9 and FIG. 10, in this embodiment, the main frame 20 includes four side frames (respectively top, bottom, left and right side frames). Each of the four side frames may be applied as the detachable side frame 25 (the top side frame is applied herein), so that the partition boards 40, 40' are able to engage into or disengage from the trough slots 24 of the main frame 20 from a side direction for changing different partition boards 40, 40'.

Figure 11:
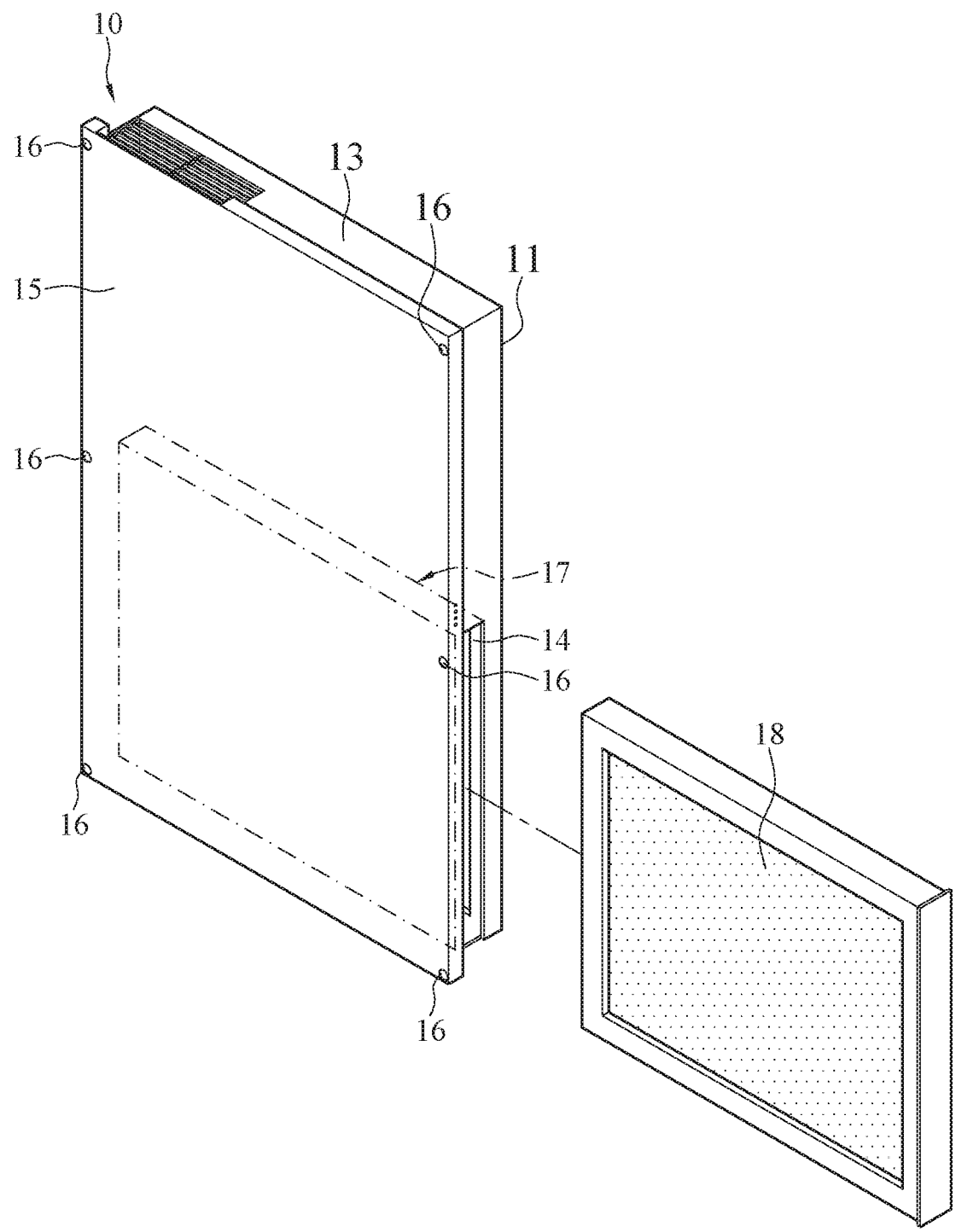
FIG. 11 illustrates an exploded perspective view of a purifier housing according to an embodiment of the instant disclosure.
Figure 12:
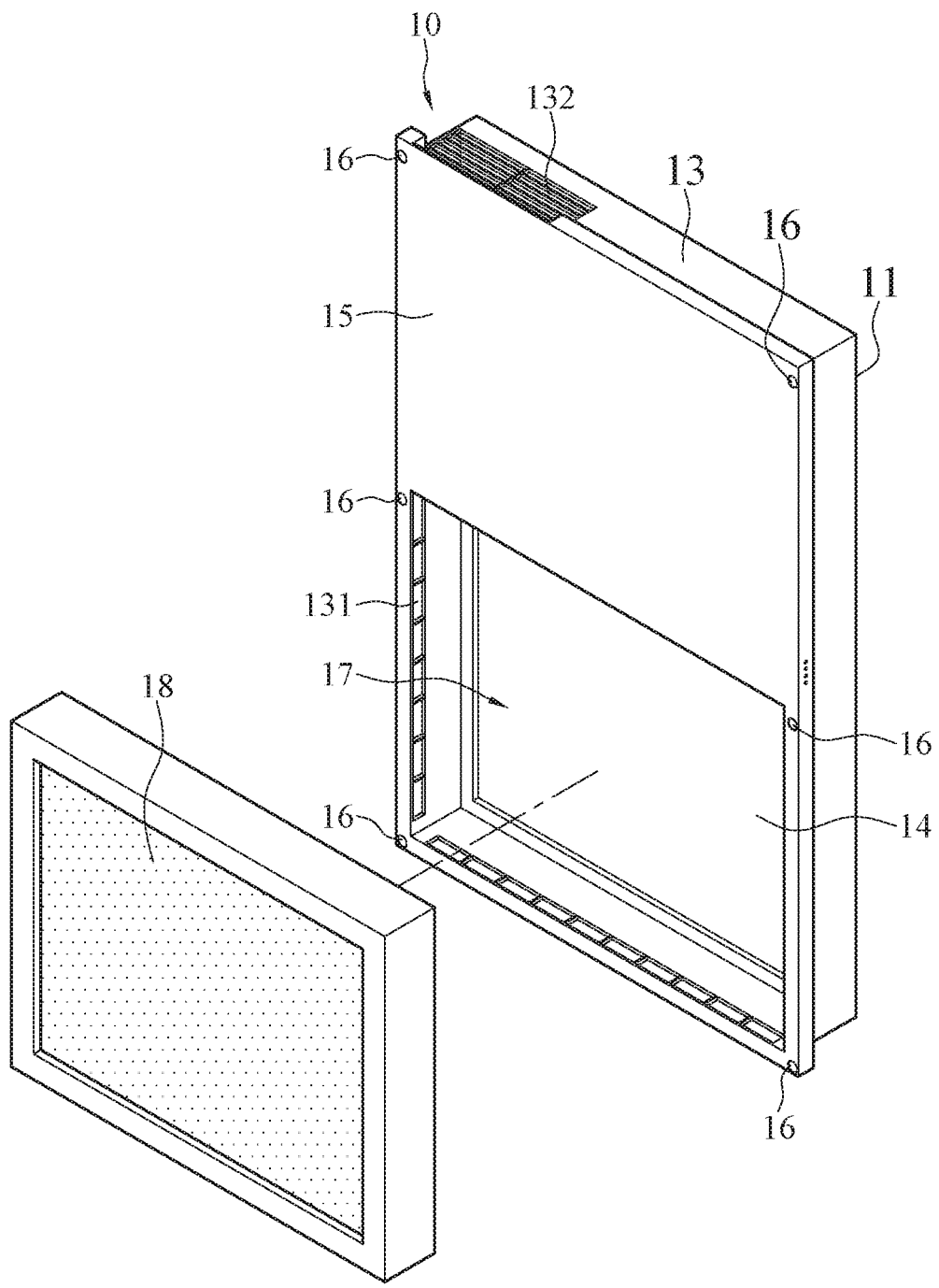
FIG. 12 illustrates an exploded perspective view of a purifier housing according to another embodiment of the instant disclosure.

Please refer to FIG. 11 and FIG. 12. In an embodiment, the purifier housing 10 includes a filter sheet 18 and a blower (omitted in the drawing), and the peripheral board 13 includes an inhaling hole 131 and a blowing hole 132. Therefore, the blower vacuums external air from the inhaling hole 131 to the interior of the purifier housing 10, passing the filter sheet 18 to filter out the contaminants (such as particulate matters, bacteria and dirty dusts) in the inhaling air. Then cleaned air is blown out through the blowing hole 132, thereby cleaning the air in the environment and preventing the environmental contaminants from damaging the imaging sheet.

In addition, as shown in FIG. 11, in an embodiment, the purifier housing 10 includes a filter chamber 17 therein to correspondingly accommodate the filter sheet 18. The peripheral board 13 includes a through hole 14 corresponding to the filter chamber 17. Therefore, the user is able to change the filter sheet 18 through the through hole 14 of the peripheral board 13, without removing the main frame 20 or the image board.

As shown in FIG. 12, the difference between this embodiment and what disclosed in the previously mentioned FIG. 11 is, that the through hole 14 is configured on the front plate 15 of the purifier housing 10. When the frame-type air purifier 1 is configured in the corner and the accessibility to the lateral side of the purifier housing 10 is limited, the filter sheet 18 may still be replaced through the front side of the purifier housing 10.

Figure 13:
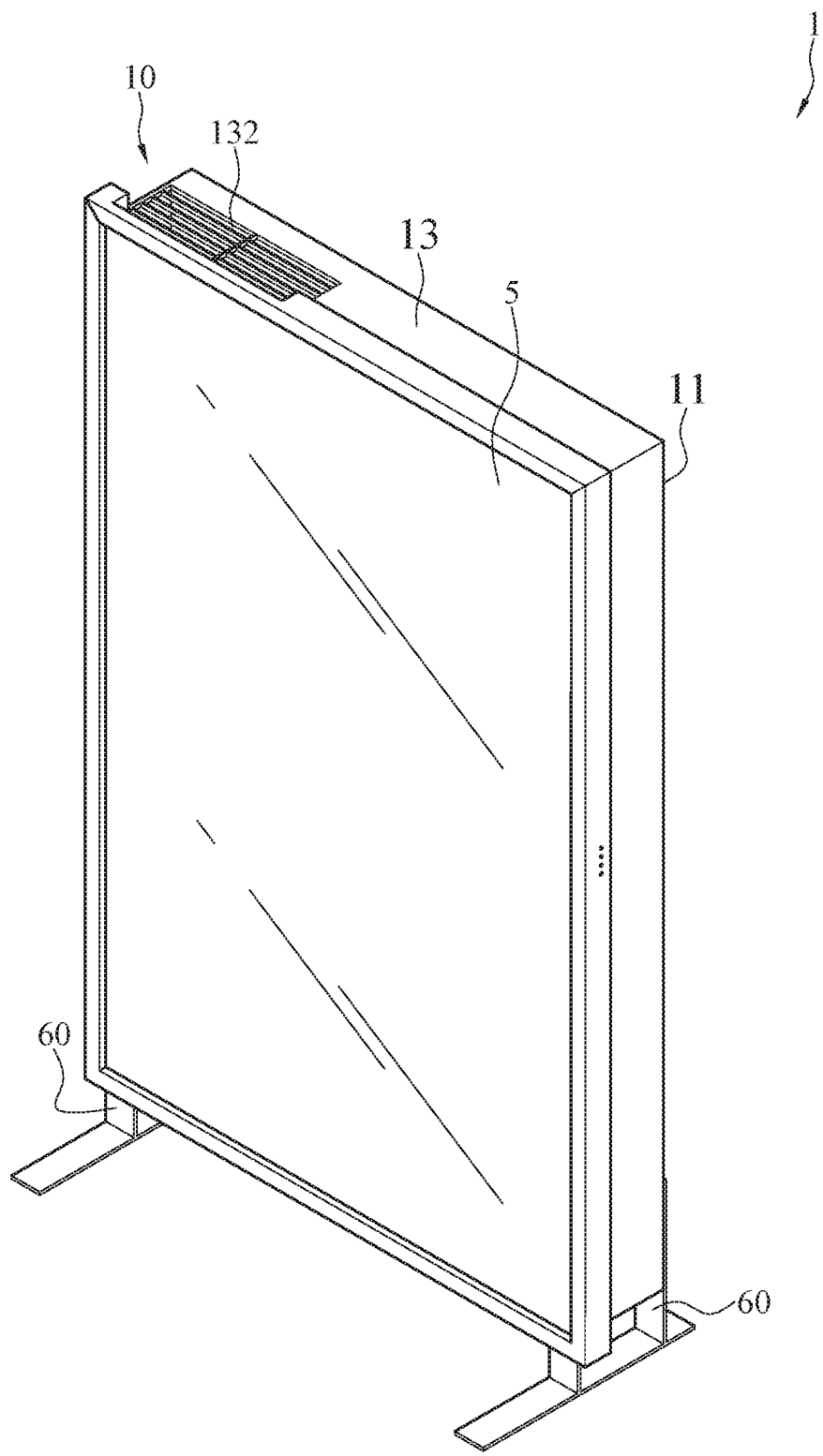
FIG. 13 illustrates a perspective view of a frame-type air purifier according to a forth embodiment of the instant disclosure.

In an embodiment, the frame-type air purifier 1 includes at least a detachable stand 60, wherein the detachable stand 60 is configured at a side of the purifier housing 10, as shown in FIG. 13, which illustrates a perspective view of a frame-type air purifier according to a forth embodiment of the instant disclosure. In the embodiment, the frame-type air purifier 1 includes two detachable stands 60. And the two detachable stands 60 are respectively assembles (such as fastens or clasps) at the bottom of the purifier housing 10, so that the frame-type air purifier 1 may be selectively hung on a wall, or disposed on the floor adjacent to a wall through the two detachable stands 60. In addition, in this embodiment, the imaging sheet 5 configured on the frame-type air purifier 1 is a mirror for the user to check his/her personal appearance.

Figure 14:
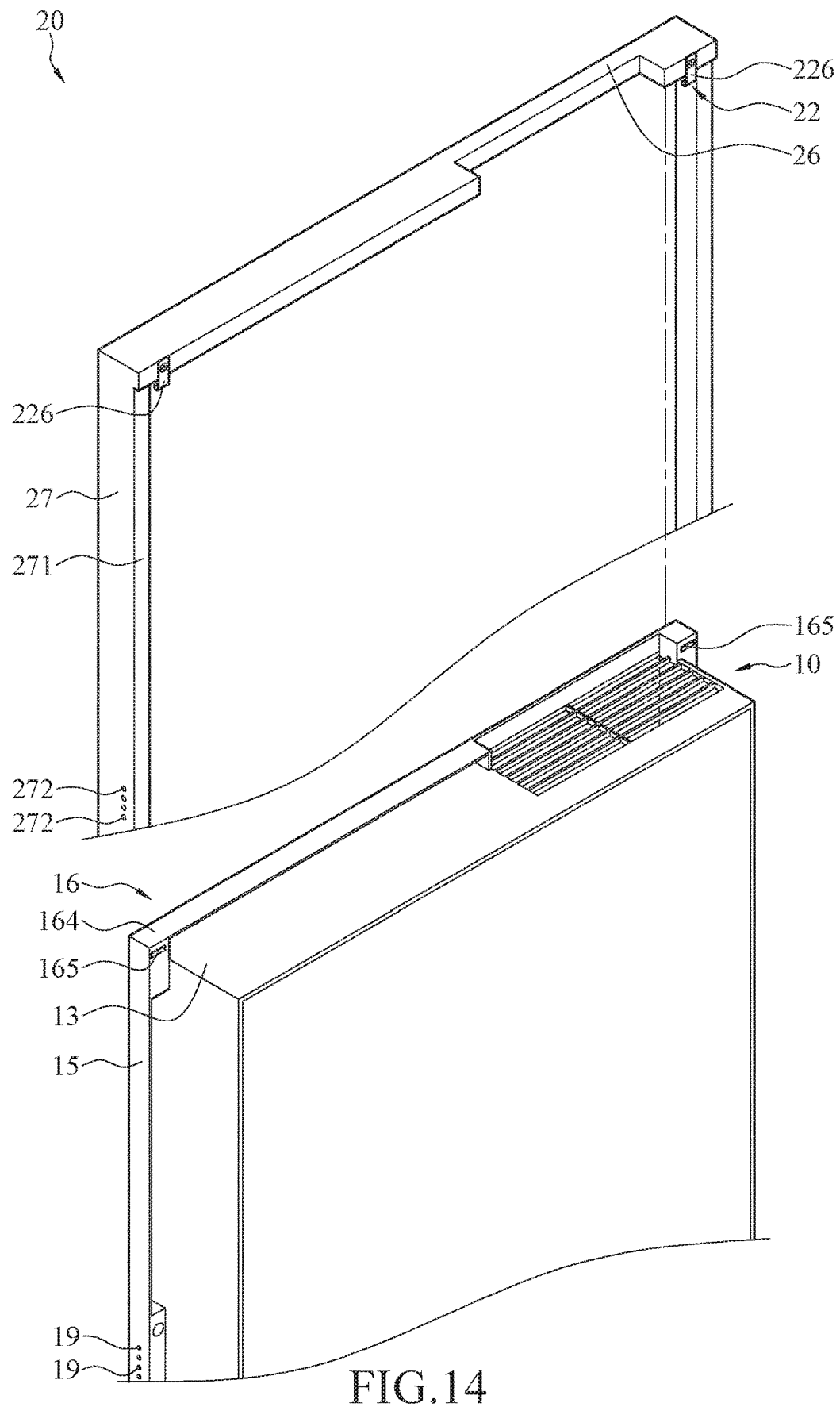
FIG. 14 illustrates an exploded perspective view of a frame-type air purifier according to a fifth embodiment of the instant disclosure.

Please refer to FIG. 14, which illustrates an exploded perspective view of a frame-type air purifier according to a fifth embodiment of the instant disclosure. In this embodiment, the quick-demounting member 16 of the purifier housing 10 is an upper flange 164 at the top portion of the front plate 15. In this embodiment, the upper flange 164 is protruding from the peripheral board 13, so that the upper flange 164 and the peripheral board 13 together form a stepped surface. The quick-demounting member(s) 22 of the main frame 20 is at least a hook member 226 (in this embodiment, the quick-demounting members 22 are two hook members 226). The main frame 20 includes a top frame portion 26, and the two hook members 226 are respectively configured on the two ends of the top fame portion 26 and able to be hooked with the upper flange 164 correspondingly. The hook member 226 may have following different implementations.

Figure 15:
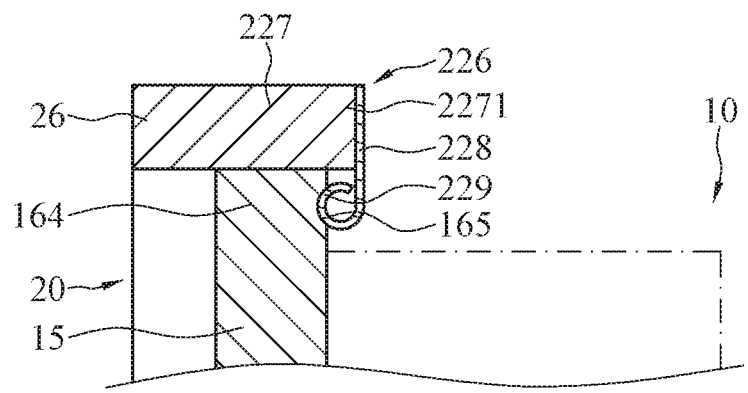
FIG. 15 illustrates a partial sectional view of the frame-type air purifier of the fifth embodiment.

As shown in FIGS. 14 and 15, in one embodiment, each of the hook members 226 includes an upper wall 227 and a hook portion 228. The upper wall 227 is extending from the top frame portion 26 of the main frame 20 and includes an assembling side 2271 opposite to the top frame portion 26. The hook portion 228 is located on the assembling side 2271. In some embodiments, the hook portion 228 may be a hard hook portion, a soft hook portion, or a flexible hook portion. For example, the hook portion 228 may be a metallic sheet or a plastic sheet and assembled on (e.g., lock, buckle, or insert) the assembling side 2271. Alternatively, as shown in FIG. 15, in which the hook portion 228 is a flexible sheet and assembled on the assembling side 2271. Accordingly, as shown in FIG. 15, the main frame 20 can be hooked with the upper flange 164 of the purifier housing 10 via the hook member(s) 226, so that the main frame 20 can be assembled with the purifier housing 10 in a quick manner. When the user has the need of demounting, simply lift the main frame 20 upwards and move the main frame 20 outwards to allow the hook member(s) 226 to detach from the upper flange 164, thereby achieving the advantages of quick demounting.

Further, as shown in FIG. 15, in this embodiment, the hook portion 228 may be a flexible sheet and the bottom of the hook portion 228 further has a folded portion 229. Therefore, during hooking the main frame 20 with the purifier housing 10, the hook portion 228 can be assembled with the purifier housing 20 properly by the guiding of the folded portion 229. Moreover, the upper flange 164 of the purifier housing 10 may have a buckling hole 165 corresponding to the folded portion 229. Hence, when the hook member 226 is hooked with the upper flange 164 of the purifier housing 10, the folded portion 229 of the hook portion 228 can be buckled with the buckling hole 165, thereby improving the structural strength of the assembled air purifier.

Figure 16:
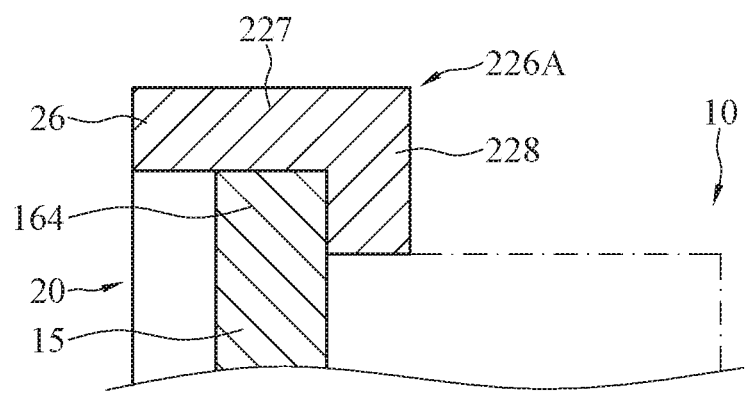
FIG. 16 illustrates a partial sectional view of a frame-type air purifier according to a sixth embodiment of the instant disclosure.

As shown in FIG. 16, the difference between this embodiment and what disclosed in the previously mentioned FIG. 15 is that, the upper wall 227 of the hook member 226A and the hook portion 228 may be integrated as a unitary member. For example, the hook member 226 is an L-shaped plate. The hook member 226A and the top frame portion 26 of the main frame 20 may be integrated as a unitary member or may be separated parts.

Figure 17:
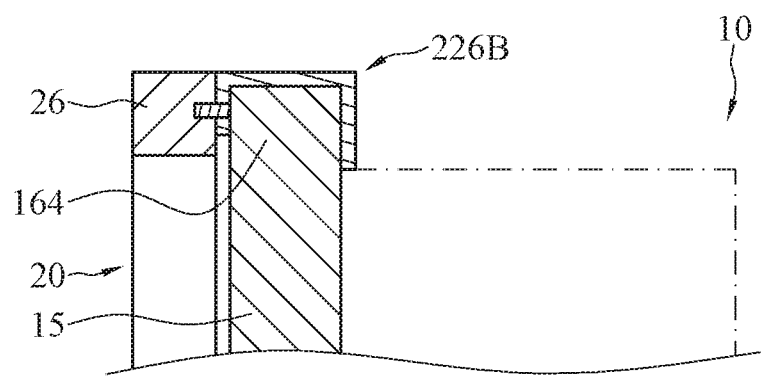
FIG. 17 illustrates a partial sectional view of a frame-type air purifier according to a seventh embodiment of the instant disclosure.

As shown in FIG. 17, the difference between this embodiment and what disclosed in the previously mentioned FIG. 15 is that, the hook member 226B may be an individual hook (e.g., a metallic hook or a plastic hook) and assembled (e.g., lock, buckle, or insert) on the top frame portion 26 of the main frame 20.

In some embodiments, the hook members 226, 226A, 226B of the foregoing embodiments may be assembled on the top portion of the image board 30 or the top portion of the outer frame 50. Therefore, the image board 30 or the outer frame 50 can be hooked with the upper flange 164 of the purifier housing 10.

Further as shown in FIG. 14, in one embodiment, the side portion of the purifier housing 10 may have at least a indicating light 19 (in this embodiment, the side portion of the purifier housing 10 has several indicating lights 19). In this embodiment, the indicating lights 19 are assembled on the side portion of the front plate 15, but embodiments are not limited thereto. The indicating lights 19 may be provided for respectively indicating air quality condition, wireless network connection state, motor operation state, dirtiness of the filter, etc. The main frame 20 may include a side frame portion 27, and a side wall 271 is extending from the side frame portion 27. The side wall 271 has a light-transmittable portion 272 corresponding to the indicating lights 19. For example, the light-transmittable portion 272 may be several light-transmittable holes respectively corresponding to the indicating lights 19. After the main frame 20 is assembled with the front plate 15 of the purifier housing 10, the side wall 271 correspondingly shields the side portion of the front plate 15 to make the appearance of the air purifier more beautiful, and the indicating lights 19 can emit lights through the light-transmittable portion 272 for indicating purposes.

Accordingly, according to the embodiments of the instant disclosure, upon operation, the frame-type air purifier has its purifier housing hanging on a wall by the wall positioners to avoid occupying an interior space or any traffic flows. The frame-type air purifier can also selectively assemble the purifier housing with the main frame or with the image board through quick-demounting members for changing imaging sheets (such as paintings, images, photographs, mirrors or hand writing boards). Therefore, the frame-type air purifier is able to achieve the advantages of freely changing different functions according to user needs without affecting the elegance of the interior environment. Furthermore, as the frame-type air purifier has corresponding quick-demounting members configured between the purifier housing and the main frame, as well as between the purifier housing and the image board, the frame-type air purifier is capable of easily changing between different main frames or image boards, thereby changing different imaging sheets thereof or its appearance styles.

What is claimed is:

1. A frame-type air purifier, comprising:
    a purifier housing, including a back plate, a peripheral board and a front plate, the peripheral board being assembled between peripheries of the front plate and the back plate, the back plate having a wall positioner configured thereon, the front plate including a first quick-demounting member configured thereon, wherein the first quick-demounting member is an upper flange at a top portion of the front plate, the upper flange protruding from the peripheral board to form a stepped surface;
    a main frame with a central hollow, the main frame having a second quick-demounting member configured thereon, wherein the second quick-demounting member is a hook member, the main frame comprises a top frame portion, and the hook member is configured on the top frame portion and capable of hooking with the upper flange correspondingly; and
    an image board, including a baseboard and an imaging sheet configured on the baseboard, the baseboard having a third quick-demounting member configured thereon;
    wherein the first quick-demounting member of the purifier housing selectively assembles with the second quick-demounting member of the main frame correspondingly, or selectively assembles with the third quick-demounting member of the image board correspondingly.

2. The frame-type air purifier of claim 1, wherein the hook member comprises an upper wall and a hook portion, the upper wall is extending from the top frame portion and comprises an assembling side opposite to the top frame portion, and the hook portion is located on the assembling side.

3. The frame-type air purifier of claim 2, wherein the hook portion is a flexible hook portion.

4. A frame-type air purifier, comprising:
    a purifier housing, including a back plate, a peripheral board and a front plate, the peripheral board being assembled between peripheries of the front plate and the back plate, the back plate having a wall positioner configured thereon, the front plate including a first quick-demounting member configured thereon, wherein the first quick-demounting member is an upper flange at a top portion of the front plate, the upper flange protruding from the peripheral board to form a stepped surface; and
    a main frame with a central hollow, the main frame having a second quick-demounting member configured thereon, wherein the second quick-demounting member is a hook member, the main frame comprises a top frame portion, and the hook member is configured on the top frame portion and capable of hooking with the upper flange correspondingly;
    wherein the first quick-demounting member of the purifier housing correspondingly assembles with the second quick-demounting member of the main frame.

5. The frame-type air purifier of claim 4, wherein the hook member comprises an upper wall and a hook portion, the upper wall is extending from the top frame portion and comprises an assembling side opposite to the top frame portion, and the hook portion is located on the assembling side.

6. The frame-type air purifier of claim 5, wherein the hook portion is a flexible hook portion.

7. A frame-type air purifier, comprising:
    a purifier housing, including a back plate and a front plate configured opposite to each other, the back plate having a wall positioner configured thereon, and the front plate including a first quick-demounting member configured thereon, wherein a side portion of the purifier housing has an indicating light; and
    a main frame with a central hollow, the main frame having a second quick-demounting member configured thereon, wherein a side wall is extending from the side portion, and the side wall has a light-transmittable portion;
    wherein the first quick-demounting member of the purifier housing correspondingly assembles with the second quick-demounting member of the main frame, and the side wall correspondingly shields the side portion of the purifier housing, the light-transmittable portion corresponding to the indicating light.

* * * * *